(12) United States Patent  
Donohue et al.

(10) Patent No.: US 9,129,299 B1  
(45) Date of Patent: Sep. 8, 2015

(54) SYSTEMS AND METHODS FOR COMPUTING PERFORMANCE METRICS FOR A SOURCING DEPARTMENT

(71) Applicant: Morgan Stanley, New York, NY (US)

(72) Inventors: Edward B. Donohue, Wyckoff, NJ (US); Minoo Fadaifard, Brooklyn, NY (US); Herjon Shaqiri, Wayne, NJ (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 14/107,084

(22) Filed: Dec. 16, 2013

(51) Int. Cl.  
*G06Q 10/00* (2012.01)  
*G06Q 30/02* (2012.01)

(52) U.S. Cl.  
CPC .................... *G06Q 30/0206* (2013.01)

(58) Field of Classification Search  
CPC . G06Q 10/0637; G06Q 10/087; G06Q 10/10; G06Q 30/02; G06Q 30/0201; G06Q 30/06; G06Q 10/06; G06Q 10/063; G06Q 10/06375; G06Q 10/0639; G06Q 30/0202; G06Q 40/06; G06Q 90/00; G06Q 10/0631; G06Q 10/0635; G06Q 10/06393  
USPC .................... 705/7.14–7.42, 30–45  
See application file for complete search history.

(56) References Cited

U.S. PATENT DOCUMENTS

| | | | | |
|---|---|---|---|---|
| 5,224,034 A * | 6/1993 | Katz et al. | ..................... | 705/7.36 |
| 7,284,204 B2 * | 10/2007 | Lee | ................. | 715/764 |
| 7,747,339 B2 * | 6/2010 | Jacobus et al. | .................. | 700/99 |
| 7,853,472 B2 * | 12/2010 | Al-Abdulqader et al. | ... | 705/7.13 |
| 7,933,792 B2 * | 4/2011 | Barnard et al. | ............... | 705/7.11 |
| 8,494,935 B2 * | 7/2013 | Sandholm et al. | ............... | 705/35 |
| 8,533,063 B2 * | 9/2013 | Erickson | ....................... | 705/26.4 |
| 8,543,473 B2 * | 9/2013 | An et al. | ......................... | 705/28 |
| 2002/0042751 A1 * | 4/2002 | Sarno | .............................. | 705/26 |
| 2002/0082966 A1 * | 6/2002 | O'Brien et al. | .................. | 705/36 |
| 2002/0087705 A1 * | 7/2002 | Smyth | ........................... | 709/229 |
| 2002/0099598 A1 * | 7/2002 | Eicher et al. | ..................... | 705/11 |
| 2002/0143677 A1 * | 10/2002 | Prakash | ........................... | 705/35 |
| 2002/0178077 A1 * | 11/2002 | Katz et al. | ....................... | 705/26 |
| 2003/0033179 A1 * | 2/2003 | Katz et al. | ......................... | 705/7 |
| 2003/0126025 A1 | 7/2003 | Powell et al. | | |
| 2003/0172008 A1 * | 9/2003 | Hage et al. | ....................... | 705/28 |
| 2003/0184588 A1 * | 10/2003 | Lee | ............................... | 345/772 |
| 2004/0068454 A1 * | 4/2004 | Jacobus et al. | .................. | 705/36 |

(Continued)

OTHER PUBLICATIONS

"IBM Emptoris Spend Analysis," IBM Software, Spend Management, Jul. 2012, 4 pages.

(Continued)

*Primary Examiner* — Alan S Miller  
(74) *Attorney, Agent, or Firm* — K&L Gates LLP

(57) ABSTRACT

Computerized systems and methods compute performance metrics for a sourcing department of a firm that measure the value-added from sourcing-related activities. Evaluation of the firm's sourcing department with the metrics should drive behaviors that optimize performance across the firm's entire sourcing portfolio. The new performance metrics include several metrics that isolate the impact of price changes and quantity changes on the overall run-rate of sourcing contracts, and several that measure of the attribution of run-rate impacts to both the sourcing department and the relevant business units. Other new metrics measure the changes in run-rate that are expected from and uncorrelated to, respectively, changes in market prices. The performance metrics can be aggregated across an expense category (or categories) and/or vendor (or vendors) to enhance expense management analytics.

19 Claims, 11 Drawing Sheets

(56) References Cited

U.S. PATENT DOCUMENTS

| | | | |
|---|---|---|---|
| 2004/0117242 A1* | 6/2004 | Conrad et al. | 705/11 |
| 2004/0167789 A1* | 8/2004 | Roberts et al. | 705/1 |
| 2008/0046303 A1* | 2/2008 | Gordon et al. | 705/9 |
| 2008/0059387 A1* | 3/2008 | Vaidhyanathan et al. | 705/500 |
| 2008/0300933 A1 | 12/2008 | Britton et al. | |
| 2008/0300959 A1* | 12/2008 | Sinha et al. | 705/10 |
| 2009/0327039 A1 | 12/2009 | Cox et al. | |
| 2010/0088155 A1* | 4/2010 | Pyle et al. | 705/10 |
| 2010/0106652 A1* | 4/2010 | Sandholm et al. | 705/80 |
| 2010/0106653 A1* | 4/2010 | Sandholm et al. | 705/80 |
| 2011/0071886 A1 | 3/2011 | Schnur et al. | |
| 2011/0225116 A1* | 9/2011 | Gupta et al. | 707/602 |
| 2012/0010916 A1* | 1/2012 | Mohanty et al. | 705/7.11 |
| 2012/0143721 A1 | 6/2012 | Hutchinson et al. | |
| 2013/0110589 A1* | 5/2013 | McCauley | 705/7.39 |
| 2013/0144803 A1* | 6/2013 | Chang et al. | 705/348 |
| 2013/0253966 A1* | 9/2013 | Mohanty et al. | 705/7.11 |

OTHER PUBLICATIONS

"Next-Generation Spend Analysis: Beyond Commodity Classifications," Ariba, Inc., May 2009, 9 pages.

"Source-to-Pay outsourcing services from IBM," IBM Global Process Services, Solution Brief, Jan. 2012, 6 pages.

D. Wilson et al., "Magic Quadrant for Strategic Sourcing Application Suites," Gartner Inc., Jul. 1, 2013, 53 pages.

"Ariba Procure-to-Pay Solution," Ariba, Inc., 2013, 2 pages.

"Oracle Procurement and Spend Analytics," Oracle Data Sheet, 2011, 5 pages.

\* cited by examiner

FIG. 3

| Scenario | | Example Ps & Qs | | | | | Run-Rate Calculations | | | RRA_ACT ≥ $0 and P_N ≤ P_M | | |
|---|---|---|---|---|---|---|---|---|---|---|---|---|
| Price | Quantity | $P_O$ | $P_N$ | $P_M$ | $Q_O$ | $Q_N$ | Baseline | New | Expected | RRA_ACT | Beta (β) RRA_EXP | Avoidance | Alpha (α) |
| $P_N > P_O > P_M$ | $Q_O > Q_N$ | 5 | 6 | 4 | 1000 | 1000 | 5,000 | 6,000 | 9,000 | 1,000 | 4,000 | (3,000) | (3,000) |
| $P_N > P_O > P_M$ | $Q_O > Q_N$ | 4 | 5 | 3 | 1000 | 1500 | 4,000 | 7,500 | 9,000 | 3,500 | 5,000 | (1,500) | (1,500) |
| $P_N > P_M > P_O$ | $Q_O > Q_N$ | 5 | 6 | 4 | 1000 | 1500 | 6,000 | 8,000 | 7,500 | 0 | 1,500 | (1,500) | (1,500) |
| $P_M > P_N > P_O$ | $Q_O > Q_N$ | 4 | 5 | 6 | 1500 | 1500 | 6,000 | 7,500 | 5,000 | 0 | (1,000) | n.a. | 1,000 |
| $P_M > P_N > P_O$ | $Q_N > Q_O$ | 4 | 5 | 6 | 1000 | 1500 | 4,000 | 7,500 | 7,500 | 3,500 | 3,500 | n.a. | 1,500 |
| $P_O > P_N > P_M$ | $Q_O > Q_N$ | 6 | 5 | 4 | 1000 | 1500 | 6,000 | 7,500 | 6,000 | 1,500 | 0 | n.a. | 1,500 |
| $P_O > P_M > P_N$ | $Q_O > Q_N$ | 6 | 4 | 5 | 1000 | 1500 | 6,000 | 6,000 | 6,000 | 4,000 | 1,000 | n.a. | 3,000 |
| $P_M > P_N > P_O$ | $Q_N > Q_O$ | 4 | 6 | 5 | 1500 | 1000 | 5,000 | 6,000 | 6,000 | (1,000) | 0 | n.a. | (1,000) |
| $P_N > P_O > P_M$ | $Q_O > Q_N$ | 4 | 6 | 5 | 1500 | 1000 | 7,500 | 6,000 | 4,000 | (1,500) | (3,500) | n.a. | 2,000 |
| $P_N > P_O > P_M$ | $Q_O > Q_N$ | 4 | 6 | 5 | 1500 | 1000 | 7,500 | 4,000 | 6,000 | (3,500) | (1,500) | n.a. | (2,000) |
| $P_O > P_N > P_M$ | $Q_O > Q_N$ | 6 | 5 | 4 | 1500 | 1000 | 9,000 | 5,000 | 4,000 | (4,000) | (5,000) | n.a. | 1,000 |
| $P_O > P_M > P_N$ | $Q_O > Q_N$ | 6 | 4 | 5 | 1500 | 1000 | 9,000 | 4,000 | 5,000 | (5,000) | (4,000) | n.a. | (1,000) |

Where:
 $P_O$ = Old (baseline) price
 $P_N$ = New (negotiated) price
 $P_M$ = Market price
 $Q_O$ = Old (baseline) quantity
 $Q_N$ = New (forecasted) quantity
 RR = Run Rate
 RRΔ = Run Rate change Alpha (α) = Portion of the run-rate change that is uncorrelated with the change in market prices. Calculated as Actual Run-rate change − Beta (i.e., expected run-rate change based on market prices). Can also be calculated as: $(P_N - P_M) * Q_N$

SYSTEMS AND METHODS FOR COMPUTING PERFORMANCE METRICS FOR A SOURCING DEPARTMENT

BACKGROUND

Most large companies have sourcing departments that are responsible for negotiating and entering into contracts with vendors to procure goods and services needed by the firm to perform its operations. Currently there are few key metrics used by sourcing departments to measure their performance. Two sourcing metrics most commonly used are "hard savings" and "cost avoidance." Hard savings represents reductions in the baseline expense run-rate achieved through sourcing deals that decrease unit prices and/or business decisions to decrease consumption. Cost avoidance represents the financial impact of actions taken by the sourcing department to reduce potential run-rate increases through negotiation of contractual prices that are below market prices. Cost avoidance is traditionally subordinated in importance to hard savings because cost avoidance is not fully derived from data recorded in the general ledger of the firm and its sub-ledgers; nor is cost avoidance directly observable through changes in the expense run-rate. Currently, therefore, sourcing departments can be incented to outperform on deals that offer the potential to generate hard savings, possibly at the expense of other deals with significant cost savings, even though the two metrics should be on equal footing from the perspective of managerial emphasis, because one dollar of cost avoidance has the equivalent economic impact of one dollar of hard savings. The lost opportunity for cost avoidance may far outweigh the hard savings, with negative consequences for the firm's pre-tax profit.

SUMMARY

In one general aspect, the present invention is directed to computerized systems and methods for computing performance metrics, or "key performance indicators" (KPIs), for a sourcing department of a firm, that measure the value-added from sourcing-related activities. As such, evaluation of the firm's sourcing department with the metrics should drive behaviors that optimize performance across the firm's entire sourcing portfolio, and not, for example, subordinate cost avoidance for hard savings. The new performance metrics include several metrics that isolate the impact of price changes and quantity changes on the overall run-rate of sourcing contracts, and several that measure of the attribution of run-rate impacts to both the sourcing department and the relevant business units. In addition, other new metrics measure the changes in run-rate that are expected from and uncorrelated to, respectively, changes in market prices. Further, the performance metrics can be aggregated across an expense category (or categories) and/or vendor (or vendors) to enhance expense management analytics. The enhanced expense management analytics can be in beneficial negotiating the commercial terms of contracts with vendors to procure goods and services as well as in managing the overall expenses of the firm.

These and other benefits of the present invention will be apparent from the description that follows.

FIGURES

Various embodiments of the present invention are described herein by way of example in connection with the following figures, wherein:

FIGS. 3 and 6 are tables showing calculated performance metrics for a sourcing department according to various embodiments of the present invention for various scenarios;

FIG. 8 illustrates a sample dashboard of the performance metrics that can be generated by the computerized system for a user according to various embodiments of the present invention;

FIGS. 9A and 9B show two related tables, with the upper table split between the two figures, showing an example where the performance metrics are computed for each of multiple goods/services covered by a single contract according to various embodiments of the present invention;

FIGS. 10 and 11 are tables showing expense analytics according to various embodiments of the present invention.

DESCRIPTION

In one general aspect, the present invention is directed to computerized systems and methods for automatically computing performance metrics for measuring the economic impact of sourcing deals (or contracts) entered into by a firm, typically through its sourcing department. The various metrics, or "key performance indicators" (or "KPIs"), and how they are computed, are described in more detail below. "Firm" is meant to encompass any type of business or organization that enters into such sourcing deals to procure the goods and services needed by the firm to perform its operations. "Goods/services" refers to the goods and/or services that are the subject of and procured by the sourcing contracts.

Figure 1:
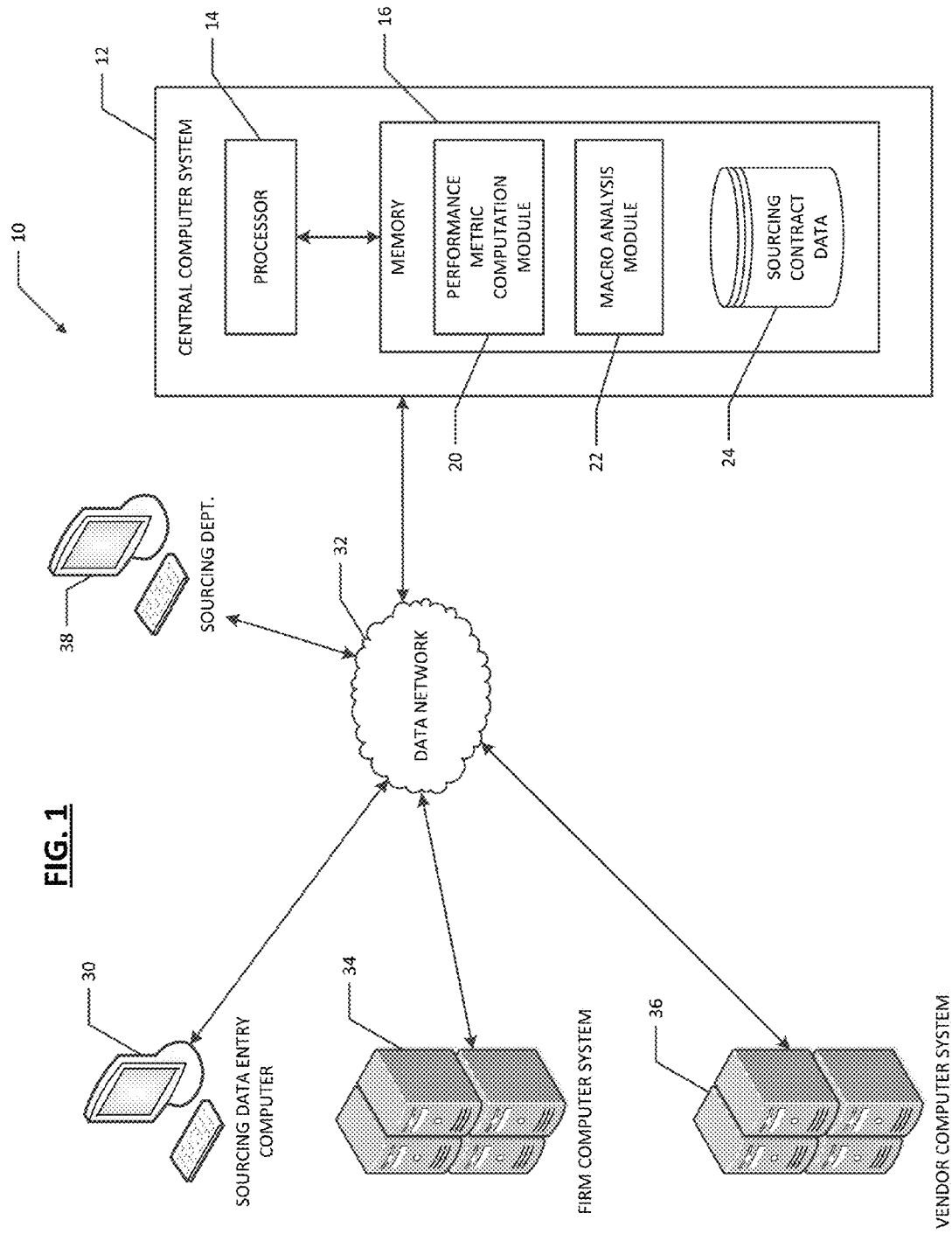
FIG. 1 is diagram of a computerized system for computing performance metrics for a sourcing department of a firm according to various embodiments of the present invention.

FIG. 1 is a simplified block diagram of a computerized system 10 for computing the performance metrics, or KPIs, according to various embodiments of the present invention. As shown in FIG. 1, the system 10 includes a central computer system 12 that computes the metrics. The computer system 12 may be implemented by one or a number of networked computer devices, such as personal computers, servers, mainframes, workstations, etc.

As shown in FIG. 1, the computer system 12 may include at least one processor 14 and at least one memory unit 16 (only one of each is shown in FIG. 1 for the sake of simplicity). The memory 16 may store software that is executed by the processor 14. In particular, the memory 16 may store a performance metric computation module 20 and an expense management analytics module 22. The performance metric computation module 20, when executed by the processor 14, causes the processor 14 to compute sourcing performance metrics for the various sourcing deals based on data about the deals, as described further below. As described in more detail below, the metrics (or KPIs) can include, in various embodiments, the overall (or net) run-rate impact and several metrics related to the impacts of price and quantity changes on the overall run-rate, metrics related to the attribution of the run-rate impact to both the sourcing department and the relevant business unit (e.g., the BU that consumes the goods/services), and several metrics that illuminate the value-add of the sourcing department, such as so-called "alpha", "beta" and "percent alpha" metrics. The expense management analytics module 22, when executed by the processor 14, causes the processor 14 to compute the same metrics (or a subset thereof) as the performance metric computation module 20, but across one or more expense categories and/or across one or more vendors of the firm, as opposed to at the contract/deal level. This analysis facilitates the ability to understand expense run-rate changes in terms of their price and consumption drivers. That understanding enables a more targeted expense management response to adverse trends that focuses on the root-causes and the responsible parties. Such analytics can also be valuable in preparing requests for proposals (RFPs). More details about the operation of the modules 20, 22 are provided below.

Data about the firm's sourcing deals, which includes unit prices and quantities for each covered good or service used to compute the metrics, may be stored in a database 24 of the memory 16. The memory 16 may be embodied as solid state memory (e.g., ROM), hard disk drive systems, SSDs, RAID, disk arrays, storage area networks (SANs), and/or any other suitable system for storing computer data and software. In addition, the memory 16 may comprise caches, including web caches and database caches. Parts of the memory 16 may be part of the computer system 12 or connected to the computer system 12 via a network connection (e.g., a LAN).

Data about the sourcing deals may be received by the computer system 12 from any reliable source and stored in the database 24. For example, as shown in FIG. 1, employees (or agents) of the firm may enter the data about the sourcing contracts through a computer 30 that is connected to the computer system 12 through a data network 32. The data network 32 may be any suitable data network for transmitting such data or data files. For example, the data network 32 preferably is an IP network such as the Internet, an intranet, an extranet, a LAN(s), a WAN(s), etc. It could also use other types of communication protocols, such as Ethernet, ATM, etc., and it could include wired and/or wireless links. When a sourcing contract is finalized, users of such computers 30 may enter the data about the new sourcing contract through a web-based interface or other suitable interface, whereupon the data is uploaded to the computer system 12. Also, instead of relying solely on users of the computers 30 to enter the relevant sourcing deal data, the computer system 12 may automatically receive the relevant data from other computer systems according to various embodiments of the present invention. For example, the computer system 12 may receive the relevant data directly from other computer systems 34 of the firm that have or otherwise store the data. These firm computer systems 34 may be programmed to upload sourcing deal data to the computer system 12 when triggered or prompted by the computer system 12. Similarly, the computer system 12 may interface with a vendor computer system 36 via the network 32 to obtain data about sourcing deals with that vendor. This may be particularly advantageous where the vendor supplies many different goods and/or services. A good example is an office supply vendor. A firm is likely to negotiate a single contract covering various office supplies, like pens, pencils, paper, etc. Thus, instead of having a user of the computer 30 input the prices and quantities purchased for these various supplies, the vendor computer system 36 could upload the quantities purchased and the respective prices for these items to the computer system 12 so that the performance metrics can be computed. In most cases the firm will negotiate individual prices for each good or service in the vendor catalog, or alternatively a discount off a referenced list price published by the vendor, in which case the price is derivable from the discount amount and list price. Also, the quantity and/or price data can be derived from invoices to the firm from the vendors. The quantity and price data from the invoices may be read and entered into the database 24, either manually or automatically. The firm could also challenge invoice prices that are different from the contract terms; this could also be done for quantity where a quantity is specified in the contract. Because they are used to upload the contract data to the central computer system 12, the remote computer systems 30, 34, 36 can be considered to be client computer systems. Also, although only one database 24 is shown in FIG. 1, it should be noted that the data could be distributed throughout data storage systems of the firm.

According to various embodiments, the performance metric computation module 20 needs the following data to compute the various sourcing metrics: old price (Po), new price (Pn), market price (Pm), old quantity (Qo), and new quantity (Qn). Thus, for example, users of the computers 30 could enter the new price(s) and quantity(ies) through the web-based interface for each new sourcing contract when it is finalized. Presumably the old price(s) and quantity(ies) (e.g., under the prior contract for the goods/services) are already stored in the database 24, although if not the user could enter those as well. Similarly, the new price(s) and quantity(ies) could be uploaded from the computer systems 34, 36. Also, the quantities for the new contract are typically estimates of the expected quantities to be consumed over the contract term or year or other time period. The estimates can be replaced with actual quantities during a reconciliation process that can be conducted at or around the anniversary of the contract. The quantities from invoices under the contact can be used to determine the actual quantity consumed.

The most reliable market price data may be used in computing the metrics. The reliability and source of the market price often depends on the nature of the goods/services. For example, for some (but generally few) goods/services there are spot markets (e.g., electricity and natural gas), which are generally the most reliable sources of market prices. The spot market prices can be used as the market prices where available. The next most reliable market price sources are benchmark prices. Such benchmark prices may be compiled by a credible intermediary (e.g., Gartner). Benchmark prices can be used for good/services where available and reliable (e.g., if it covers a sufficiently broad spectrum of vendors or suppliers in the relevant market and is current). Because of the cost and limited timeliness of benchmark data, it is often only available for major spend categories (e.g., IT expenses).

In the absence of unambiguous market price information sourced through the spot market or current benchmarking studies, the approach to determining a proxy for market price can vary depending on whether the contract was competitively bid or sole sourced. Competitively bid contracts are awarded on the basis of bids received from an invited group of prequalified contractors, suppliers, or vendors. With competitively bid contracts, the proxy for market price can be set to the lowest bid in the first round of bid submissions after eliminating left-tail outlier(s). In various embodiments, left-tail outliers may be bid prices more than X % below (e.g., 20% below) the median bid price. Sole source contracts (a/k/a "no-bid contracts") are contracts covering a good or service for which there is only one qualified contractor, supplier, or vendor in the market. In a sole source contract, the proxy for market price may be set to the first credible price offered by the vendor (typically the second offered price). The users of the computer 30 may input the market price, as best determined, for the sourcing contracts.

Also, some sourcing contracts provide pricing that varies by tier, with specific criteria established for each tier, which can complicate determining the new price for each year (or other time period) of the contract. Typically, the criteria are volume-based, with unit prices dropping as volumes purchased increase. Tiers may provide a flat price for all units purchased within a defined range, or a minimum cost corresponding to a defined threshold quantity plus an agreed per unit price for each unit purchased above the minimum. According to various embodiments, the price "P" for a tiered pricing contract can be calculated by dividing the total amount paid by the quantity purchased. For example, a market data contract provides for tiered monthly pricing. For Tier 1, pricing is $500,000 per month up to 1,000 users, plus $417 per month per additional user above 1,000 up to 1,999. For Tier 2, pricing is $666,667 per month for up to 2,000 users plus $292 per additional user. Over the first year of the contract, the Firm paid the vendor a total of $6,655,635 based on 945 weighted average monthly users. For this example, New Q=945 and New P=$7,043 (that is, $6,655,635/945). Old P and Old Q could be calculated in the same manner.

Using the gathered data, the performance metric computation module 20 can compute the following performance metrics/KPIs for individual sourcing deals (or contracts) according to various embodiments:

Overall (or net) run-rate impact (or change); this can be either a negative value representing "hard savings" or a positive value representing "spend increases;"
Impact of unit price change on overall run-rate;
Impact of quantity change on overall run-rate;
Joint impact of price and quantity changes on overall run-rate;
Attributions of Run-Rate Impact to sourcing and relevant business unit;
Expected run-rate change based on current market prices ("Beta");
Portion of the run-rate change that is uncorrelated with the change in the market ("Alpha");
% Alpha, i.e., Alpha as a percentage of Beta; and/or
Cost Avoidance.

The computations for these metrics according to various embodiments will now be described.

Overall Run-Rate Impact.

Run-rate can be measured as price per unit times the number of units consumed or purchased at that price over a time period, generally the term of the contract. Thus, in various embodiments, the overall (or net) run-rate impact (or change) represents the difference between the old run-rate and the new run-rate reflecting the terms of the new contract and expected consumption, typically for like time periods (e.g., 1 year). Thus, if $P_n$ represents the unit price for time period n and $P_{n-1}$ represents the unit price for the prior time period (i.e., time period n−1), and $Q_n$ represents the number of units consumed/purchased in time period n and $Q_{n-1}$ represents the number of units consumed/purchased in the prior (n−1) time period, then the overall run-rate impact may be computed as:

Overall Run-Rate Impact=$(P_n \times Q_n)-(P_{n-1} \times Q_{n-1})$

As an example, suppose Firm A negotiates a new two-year contract with Consulting Co. B for certain services. Consulting Co. B submitted a proposal reflecting a 15% rate increase (from the prior unit price of $600). Other firms negotiated base rate increases of 10%, plus 3.17% annual COLA increases, but Firm A negotiates a substantially better two-year deal with only a 5% base rate increase in the first year and a 3.17% COLA adjustment in the second year. Demand is forecasted to grow by 200 days (from 1000 days to 1200 days) in the first year of the contract, and 300 days in the second year. Table 1 below shows the impact on the run-rate in the first and second years of the contract. Despite favorable comparison with market benchmarks, the deal results in a $156,000 overall run-rate impact in the first calendar year, driven by the 5% increase in daily rates and 20% increase in quantity consumed. The second year of the contract produces a $219,000 year-over-year increase in the overall run-rate impact due to the combined effect of 3.17% COLA adjustment and 25% increase in consumption.

TABLE 1

| | Baseline | First 12 Mos. | Second 12 Mos. |
|---|---|---|---|
| Unit Price | $600 | $630 | $650 |
| Quantity (Days) | 1000 | 1200 | 1500 |
| Total Run-Rate | $600,000 | $756,000 | $975,000 |
| Overall Run-Rate Impact | NA | $156,000 | $219,000 |
| Price Change Impact | NA | $30,000 | $24,000 |
| Quantity Change Impact | NA | $120,000 | $189,000 |
| Joint Price/Quantity Change Impact | NA | $6,000 | $6,000 |

The $156,000 overall run-rate impact for the first year can be calculated as ($630×1200)−($600×1000), or the run rate for year 1 minus the baseline run-rate. Similarly, the overall run-rate impact for the second year can be calculated as ($650×1500)−($630×1200), or the run rate for year 2 minus the run-rate for year 1.

Impact of Unit Price Change on Overall Run-Rate.

The impact of unit price change (or "price change impact") on overall run-rate may represent the change in price multiplied by the prior time period quantity. That is, the impact of unit price change on overall run-rate for time period n may be computed as $\Delta P \times Q_{n-1}$, where $\Delta P$ is the price difference from time period n to time period n−1 (i.e., $\Delta P = P_n - P_{n-1}$). Continuing the example above, Table 1 above shows the contribution of the change in unit price to the overall change in run-rate ("Price Change Impact," line 6). The 5% increase in prices in the first year of the contract drives a $30,000 run-rate increase (+$30×1,000). In the second year, the 3.17% COLA adjustment drives a $24,000 increase in the run-rate (+$20×1,200).

Impact of Quantity Change on Overall Run-Rate.

The impact of quantity change on overall run-rate ("Quantity Change Impact") may represent the change in quantity multiplied by the prior time period price. That is, the impact of quantity change on overall run-rate for time period n may be computed as $\Delta Q \times P_{n-1}$, where $\Delta Q$ is the quantity difference from time period n to time period n−1 (i.e., $\Delta Q = Q_n - Q_{n-1}$). Continuing the example above, Table 1 above shows that the contribution of the change in consumption to the overall change in run-rate ("Quantity Change Impact," line 7). The 200-day increase in consumption in the first year of the contract drives a $120,000 run-rate increase in the first calendar year (+200×$600). In the second year, the 300-day increase in consumption drives an $189,000 increase in the run-rate (+300×$630).

Figure 2:
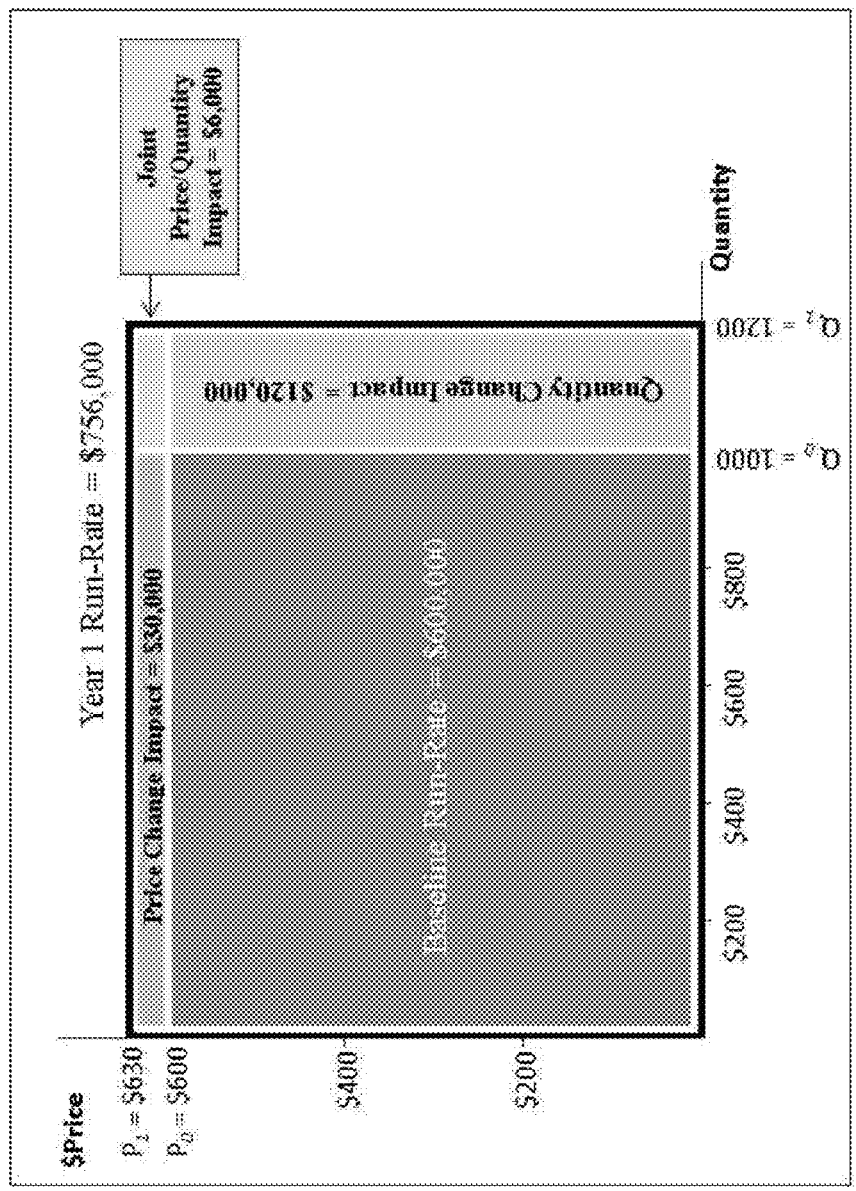
FIG. 2 is a chart illustrating the concepts of baseline run-rate, price change impact on run-rate, quantity change impact on run-rate, and joint impact of price and quantity changes on run-rate.

Joint impact of price and quantity changes on overall run-rate. Most of the run-rate impact is captured through the price and quantity components. A residual component representing the combined effect of changes in price and quantity explains the rest. In various embodiments, this residual component, the joint impact of price and quantity changes on overall run-rate, for time period n may be computed as $\Delta Q \times \Delta P$, where $\Delta Q = Q_n - Q_{n-1}$ and $\Delta P = P_n - P_{n-1}$. Continuing with the example, as shown in Table 1, in the first year the $30-increase in price combined with the 200-unit increase in quantity drives a $6,000 run-rate increase (+$30×200) (See "Joint Price/Quantity Change Impact", line 8). In the second year, the $20-COLA increase combined with the 300 quantity increase drives a $6,000 increase in the run-rate (+$20×300). The summation of the three drivers of change in the run-rate—the price change impact, the quantity change impact and the joint price/quantity change impact—fully account for the change in the overall run-rate. FIG. 2 graphically depicts the relationship among the three drivers in reconciling the baseline run-rate of $600,000 to the new run-rate of $756,000 for year 1 in the example.

Attribution of Run-Rate Impact.

Attribution of the drivers of change in run-rate expenses ensures clear accountability for expense management and enables targeted remediation of unexpected run-rate increases. The overall run-rate impact and cost avoidance driven by unit price changes can generally be attributed to the firm's sourcing function or department given its responsibility for managing vendor pricing. However, this rule may not apply in all situations. To illustrate, assume that the firm (through its sourcing function) enters into renewal negotiations with the incumbent vendor that manages an IT service for the firm. After protracted negotiations, the best deal that could be reached held prices equal to those of the expiring contract. However, the vendor subsequently agreed to 5% reductions in unit pricing when the firm's business unit (i.e., not the sourcing function) proposed longer wait times on service calls and other cuts in service levels. Attribution of the impact of the 5% unit price reduction should be attributed to the business, which drove the price reduction by accepting reductions in the service offering. Accordingly, in various embodiments, attribution of the net run-rate impact of sourcing activities and cost avoidance driven by changes in consumption of goods and services is attributed to the business, whereas attribution to the sourcing function is appropriate only when the value-added by sourcing function is substantive. According to various embodiments, that requirement is satisfied when the following two conditions have been met (e.g., in the opinion of the sourcing category leader):

1. Sourcing department independently identified and acted as champion for the savings idea based on its own independent analysis of consumption data, discussions with vendors or other sourcing-related activities; and
2. Sourcing department provided significant sourcing expertise and execution resources that were essential to the realization of the savings.

Applying these principles to the ongoing example prescribes that of the $156,000 total run-rate increase in the first year of the contract, the $30,000-price change impact would be attributed to sourcing department, while the $120,000-quantity change impact would be attributed to the consuming business units. Attribution of the $6,000 joint impact is less straightforward given its derivation from changes in both price and quantity consumed. According to various embodiments, allocation of the joint impact is made in proportion to the impact of price and quantity changes on the run-rate excluding the joint impact. That is, according to various embodiments, the sourcing department's share of the joint impact of price and quantity changes on overall run-rate for time period n may be computed as:

$$\text{Sourcing Dept. Share of Joint Impact} = \frac{|\text{Price Change Impact}|}{|\text{Price Change Impact}| + |\text{Quantity Change Impact}|} \times (\Delta Q \times \Delta P),$$

and the business unit's share of the joint impact of price and quantity changes on overall run-rate for time period n may be computed as:

$$\text{BU Share of Joint Impact} = \frac{|\text{Quantity Change Impact}|}{|\text{Price Change Impact}| + |\text{Quantity Change Impact}|} \times (\Delta Q \times \Delta P).$$

Thus, the overall attribution of the overall run-rate impact to the sourcing department for time period n may be computed as:

Sourcing Dept. Attribution=Price Impact+Sourcing Dept. Share of Joint Impact, and the overall attribution of the overall run-rate impact to the business unit for time period n may be computed as:

BU Attribution=Quantity Impact+BU Share of Joint Impact.

Table 2 below show the attributions for both the sourcing department and the business unit for year 1 in the ongoing example.

TABLE 2

|  | Baseline | First 12 Mos. | Attribution | |
|---|---|---|---|---|
|  |  |  | Sourcing Dept. | BU |
| Unit Price | $600 | $630 |  |  |
| Quantity (Days) | 1000 | 1200 |  |  |
| Total Run-Rate | $600,000 | $756,000 |  |  |
| Overall Run-Rate Impact | NA | $156,000 |  |  |
| Price Impact | NA | $30,000 | $30,000 | $0 |
| Quantity Impact | NA | $120,000 | $0 | $120,000 |
| Joint Price/Quantity Impact | NA | $6,000 | $1,200 | $4,800 |
| TOTAL |  | $156,000 | $31,200 | $124,800 |

Figure 3:
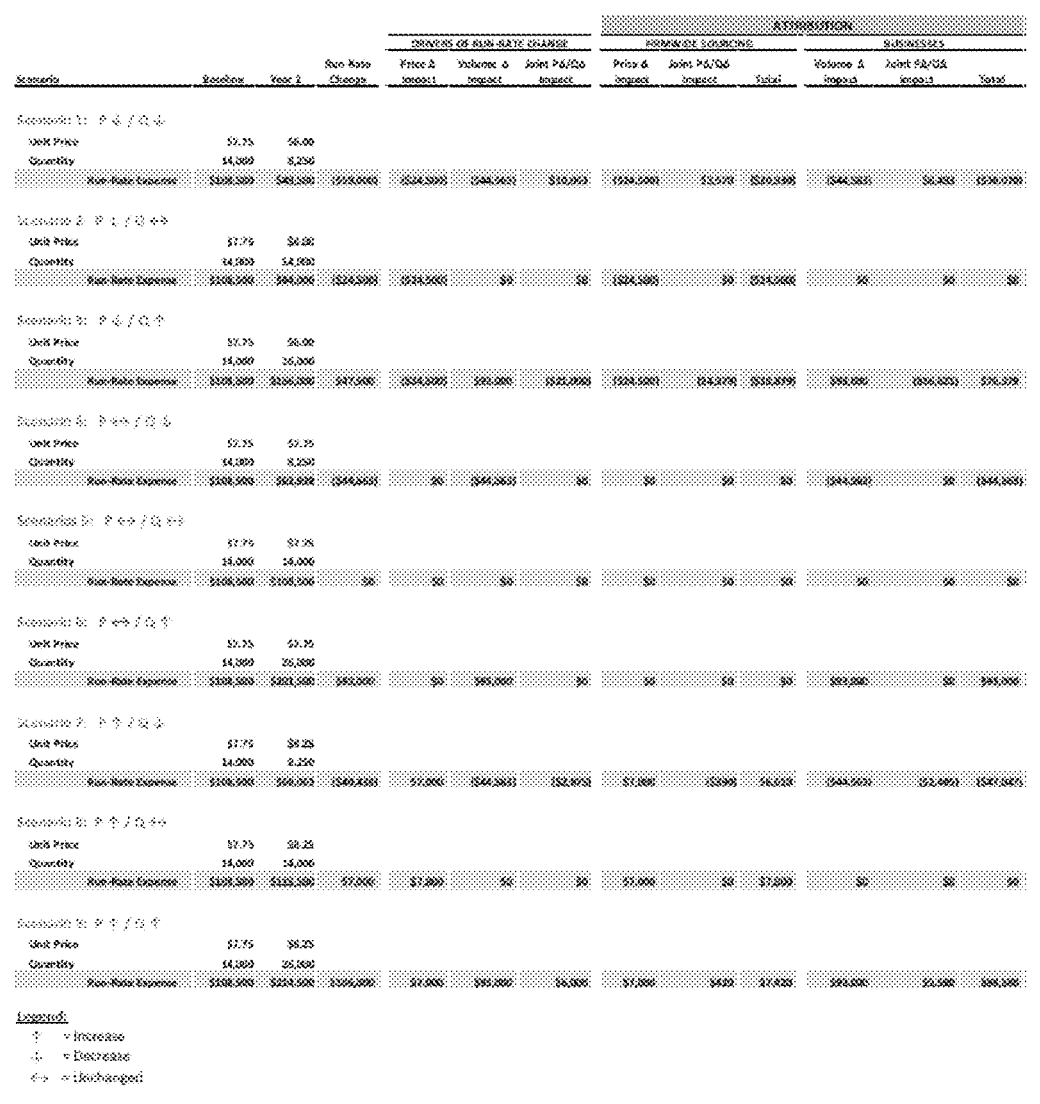

FIG. 3 includes a table showing nine different examples where the year-over-year prices and quantities increase, decrease or remain even. For each scenario, the table in FIG. 3 shows:

Overall run-rate impact (denoted "Run-Rate Change")

Impact of unit price change on overall run-rate (denoted "Price Δ Impact")

Impact of quantity change on overall run-rate (denoted "Volume Δ Impact")

Joint impact of price and quantity changes on overall run-rate (denoted "Joint PΔ/QΔ Impact")

The sourcing department's attribution of the joint impact (denoted "Joint PΔ/QΔ Impact" under the "Firmwide Souring" heading)

The sourcing department's total attribution (the sum of the Price Δ Impact and the sourcing department's attribution of the joint impact)

The business unit's attribution of the joint impact (denoted "Joint PΔ/QΔ Impact" under the "Business" heading)

The business unit's total attribution (the sum of the Volume Δ Impact and the business unit's attribution of the joint impact).

Expected Run-Rate Change Based on Current Market Prices ("Beta").

The metrics described above, while informative and valuable, do not fully address the question of whether the firm's sourcing department is overachieving or underachieving on negotiated contract pricing relative to the market. One new metric that addresses this question is so-called "Beta," which measures the expected run-rate change based on current market prices. According to various embodiments, Beta (β) for time period n may be computed as:

$$\beta_n = (P_{m,n} \times Q_n) - (P_{n-1} \times Q_{n-1})$$

where $P_{m,n}$ is market price for the time period n and $Q$, represents the expected consumption for time period n. The market price may be determined based on the best data available, as described above.

Portion of the Run-Rate Change that is Uncorrelated with the Change in the Market ("Alpha").

Another new metric that addresses the question of whether the sourcing department is overachieving or underachieving on negotiated contract pricing relative to the market is the portion of the run-rate change that is uncorrelated with the change in the market (so-called "Alpha"). That is, Alpha may represent the difference between the expected run-rate change (i.e., β) and the actual run-rate change. Alpha is driven by either market-beating or market underperforming contract pricing and is measurable on all sourcing deals, regardless of whether they produce hard savings, run-rate increases, or cost avoidance. According to various embodiments, Alpha (α) for time period n may be computed as:

$$\alpha_n = RR\Delta_{ACT} - \beta_n$$

where $RR\Delta_{ACT} = (P_n \times Q_n) - (P_{n-1} \times Q_{n-1})$.

Alpha as a Percentage of Beta ("% Alpha").

Another new metric to address this question is Alpha as a percentage of Beta ("% Alpha"), which normalizes for deal size. According to various embodiments, % Alpha for time period n may be computed as:

$$\% \text{ Alpha} = (\alpha_n / \beta_n) \times 100$$

where $\alpha_n$ is the alpha for time period n and $\beta_n$ is the beta for time period n.

Figure 4:
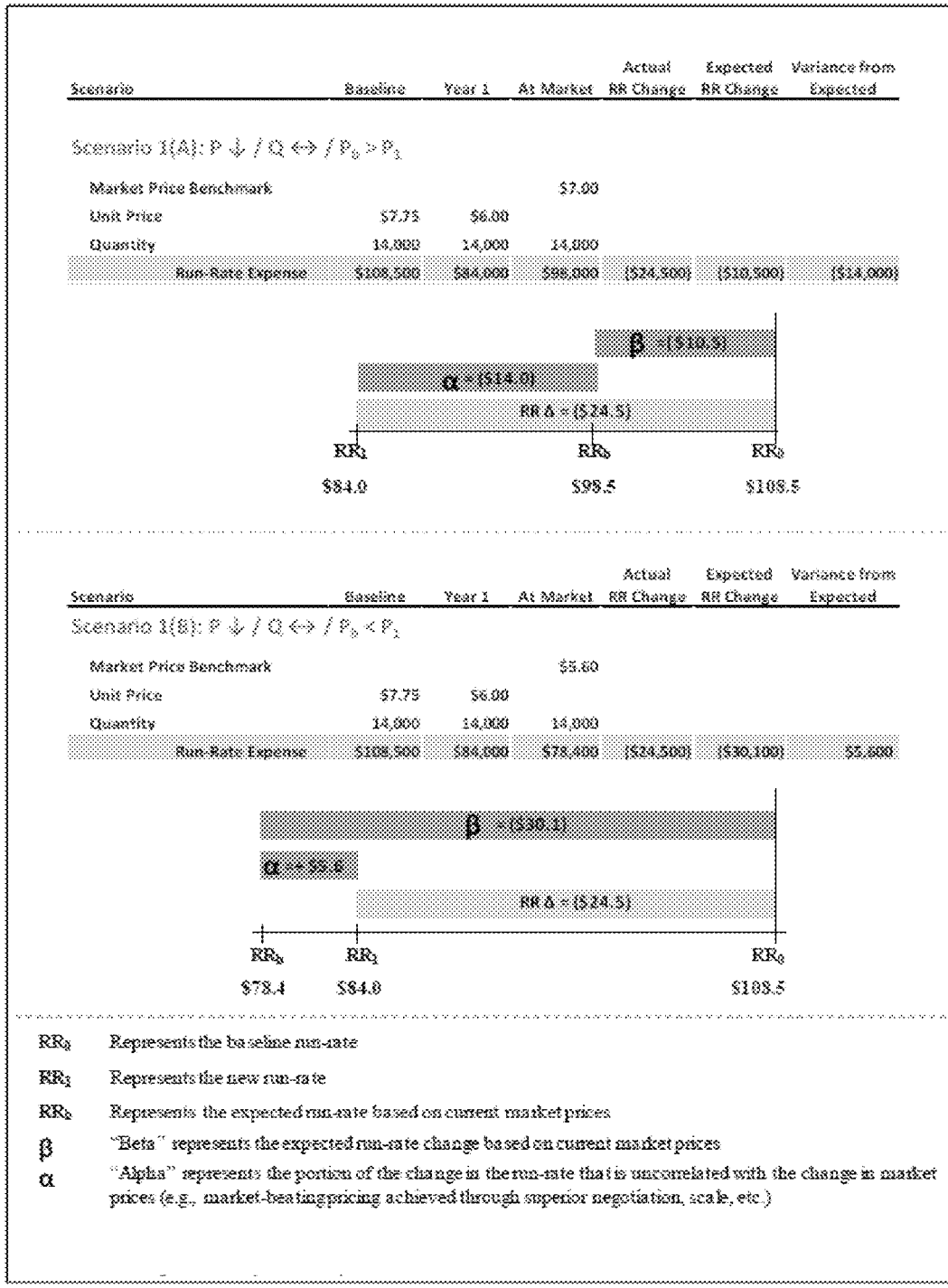
FIGS. 4 and 5 illustrate the concepts of Alpha and Beta performance metrics for various different scenarios according to various embodiments of the present invention.
Figure 5:
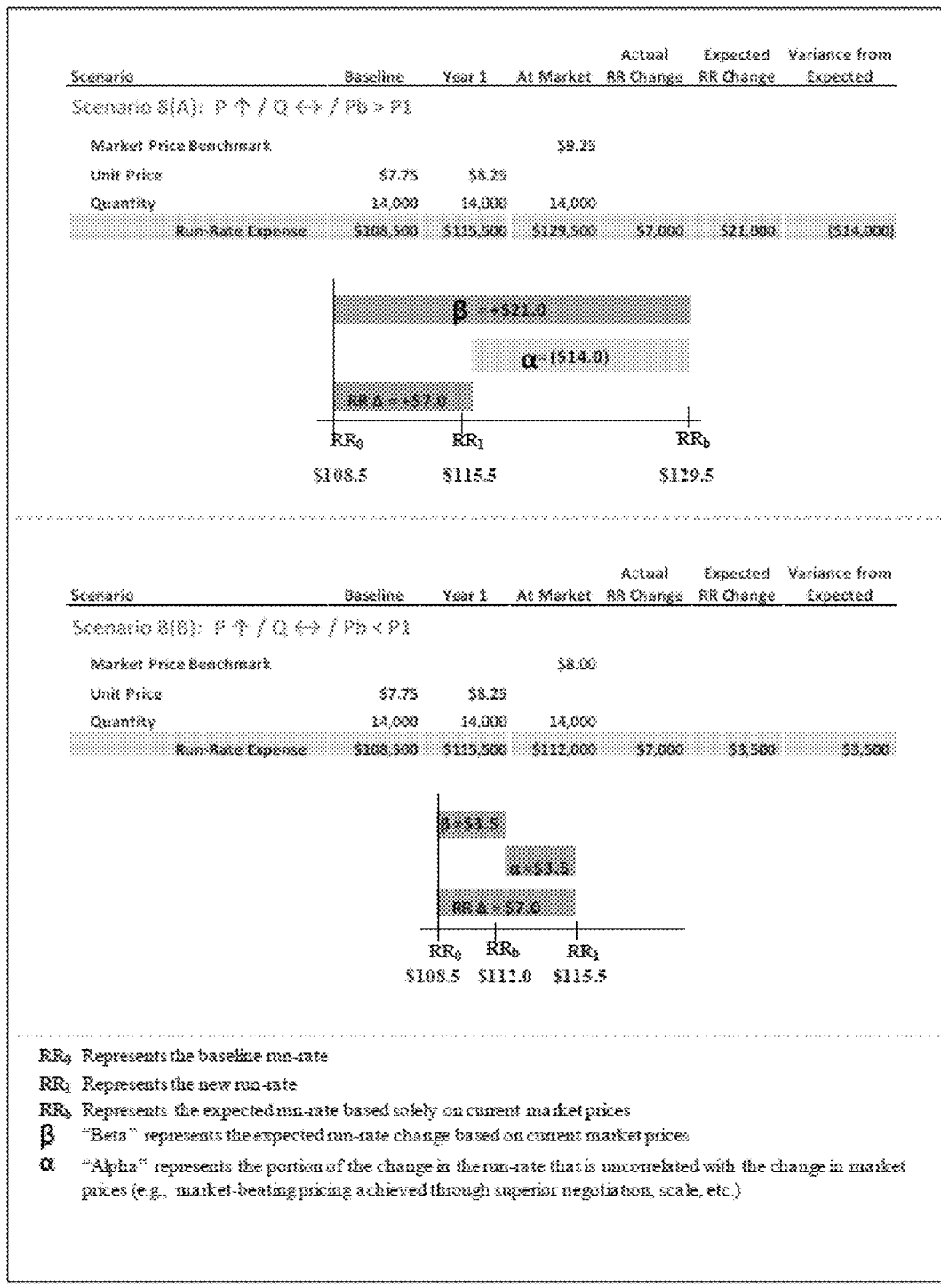

FIGS. 4 and 5 graphically illustrate the Alpha and Beta performance metrics under different scenarios. In particular FIG. 4 shows two price deflation scenarios and FIG. 5 shows two price inflation scenarios (the numbers of the scenarios in FIGS. 4 and 5 correspond to the numbers for the scenarios in FIG. 3). In Scenario 1(A) in FIG. 4, the unit price went down from $7.75 to $6.00, and the quantity stayed the same (14,000). The market price is $7.00 per unit. In this scenario, as shown in FIG. 4:

Baseline run-rate ($RR_0$) is $108,500 (computed as $7.75× 14,000);
New run-rate (RR1) is $84,000 (computed as $6.00×14,000); and
Market price run-rate ($RR_b$) is $98,000 (computed as $7.00×14,000).

Accordingly, Beta (the expected run-rate change based on market prices) is negative $10,500 (computed as $-0.75×14,000), and Alpha (the portion of the run-rate change that is uncorrelated to the change in market price) is negative $14,000 (computed as $-1.00×14,000). Percent Alpha in this scenario is 133.3%.

Scenario 1(B) in FIG. 4 is the same as Scenario 1(A), except that in Scenario 1(B) the market price is $5.60. That is, the sourcing department negotiated a price above the market price. In this scenario, as shown in FIG. 4:

Baseline run-rate ($RR_0$) is $108,500 (same as Scenario 1(A));
New run-rate (RR1) is $84,000 (same as Scenario 1(A)); and
Market price run-rate ($RR_b$) is $78,400 (computed as $5.60×14,000).

Accordingly, Beta is negative $30,100 (computed as $-2.15× 14,000), and Alpha is positive $5,600 (computed as $0.40× 14,000). Percent Alpha in this scenario is −18.6% in FIG. 4. Firms traditionally measured the change in run-rate in the scenarios (that is, negative $24,500) as hard savings, but they did not measure Alpha and Beta.

In Scenario 8(A) in FIG. 5, the unit price increased (from $7.75 to $8.25), and the market unit price is $9.25, so the firm negotiated a below-market price. The quantity stayed even at 14,000. In this scenario, as shown in FIG. 5:

Baseline run-rate ($RR_0$) is $108,500 (same as FIG. 4);
New run-rate (RR1) is $115,500 (computed as $8.25×14,000); and
Market price run-rate ($RR_b$) is $129,500 (computed as $9.25×14,000).

Accordingly, Beta is positive $21,000 (computed as $1.50× 14,000), Alpha is negative $14,000 (computed as $-1.00×14,000), and Percent Alpha is −66.7%. Scenario 8(B) in FIG. 5 is the same as Scenario 8(A), except that the market price is $8.00 per unit, such that the firm negotiated an above-market price. In this scenario, as shown in FIG. 5:

Baseline run-rate ($RR_0$) is $108,500 (same as before);
New run-rate (RR1) is $115,500 (computed as Scenario 8(A)); and
Market price run-rate ($RR_b$) is $112,000 (computed as $8.00×14,000).

Accordingly, Beta is positive $3,500 (computed as $0.25×14,000), Alpha is also positive $3,500 (computed as $0.25×14,000), and Percent Alpha is 100%.

Cost Avoidance.

Cost avoidance may represent the financial impacts of actions taken by the sourcing function to mute run-rate increases through negotiation of contractual prices that are at or below market prices. According to various embodiments, cost avoidance for time period n is set to the alpha for time period n ($\alpha_n$) when two conditions are met, namely: (1) the change in the actual run-rate is greater than or equal to $0; and (2) the negotiated unit price is less than or equal to the market price.

FIG. 6 is a table show the Alpha, Beta, and Cost Avoidance calculations for several more scenarios.

Figure 7:
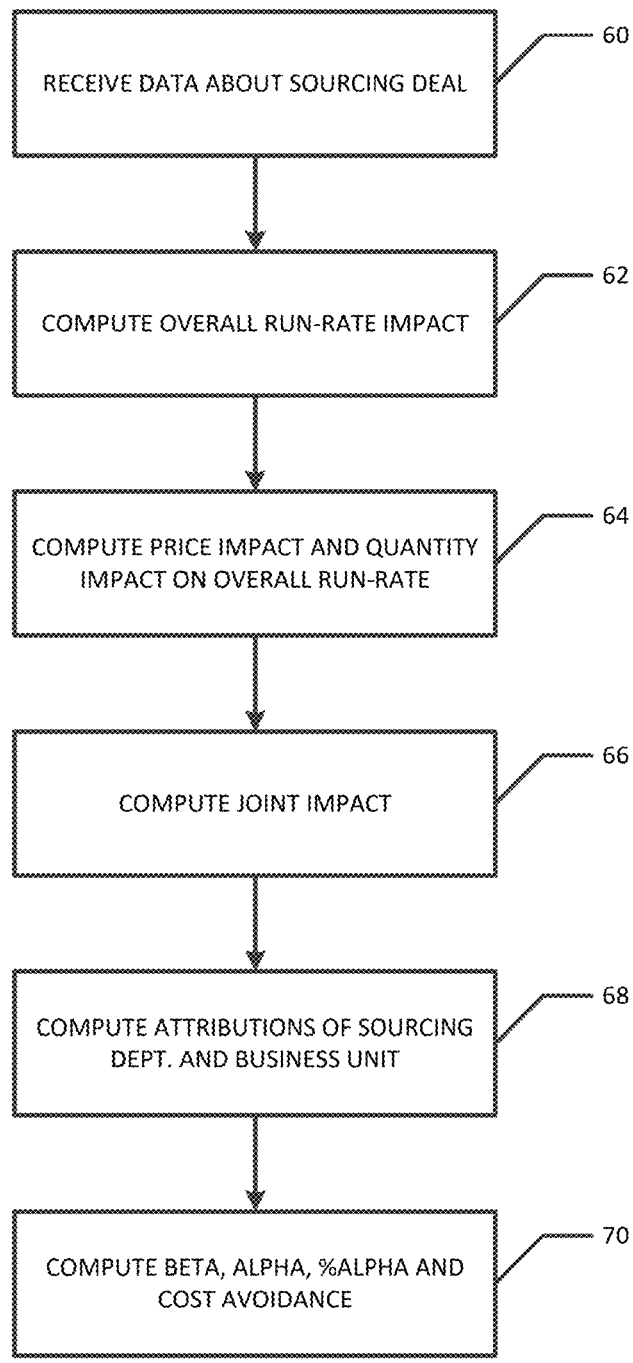
FIG. 7 is a flowchart showing a process flow for the computerized system for computing the performance metrics according to various embodiments of the present invention.

FIG. 7 is a flowchart showing the process flow of the computer system 12, when executing the code of the performance metric computation module 20, to compute the various performance metrics (or KPIs) described above according to various embodiments. The process shown in FIG. 7 is for one sourcing deal or contract; the process can be replicated for each sourcing deal or contract for which the metrics are computed. The process starts at step 60 where the data for the deal is received by the computer system 12. As described above, the data may include the new price (Pn) and new quantity (Qn) for each new sourcing contract, which may be uploaded to the computer system 12 when the contract is finalized. Again, these data may be received, referring to FIG. 1, from a user of the computer 30, a firm computer system 34, and/or a vendor computer system 36. And if the sourcing contract database 24 does not already have the prior/old price (Po) and/or the prior/old quantity (Qo) for the goods/services that are the subject of the sourcing contract, that data would also need to be supplied to the computer system 12. As mentioned above, the initial quantity amounts for a contract may be estimates of the quantity expected to be consumed. During the term of the contract, actual quantity data can be ascertained from vendor invoices. Also, the best available market price (Pm) should be supplied to the computer system 12 as discussed above.

Next, at step 62 the overall run-rate impact can be computed as described above. Next, at step 64, the price change and quantity change impacts on the overall run-rate can be computed as described above. Next, at step 66 the joint impact can be computed. At step 68 the overall, respective attributions of the sourcing department and the business unit can be computed. Next, at step 70, beta, alpha, % alpha and cost avoidance can be computed as described above. In other embodiments, the metrics do not need to be computed in the order shown in FIG. 3. For example, beta, alpha and % alpha (step 70) could be computed before or at the same time as the attributions of the sourcing department and business unit (step 68), or before or at the same time as the joint impact (step 66), etc. Also, in other embodiments not all of the metrics need to be computed. For example, a firm could decide not to compute the attributions of the sourcing department and business unit (step 68) or some other metric(s) in various embodiments if they did not find them worthwhile.

Figures 8, 10, 11:
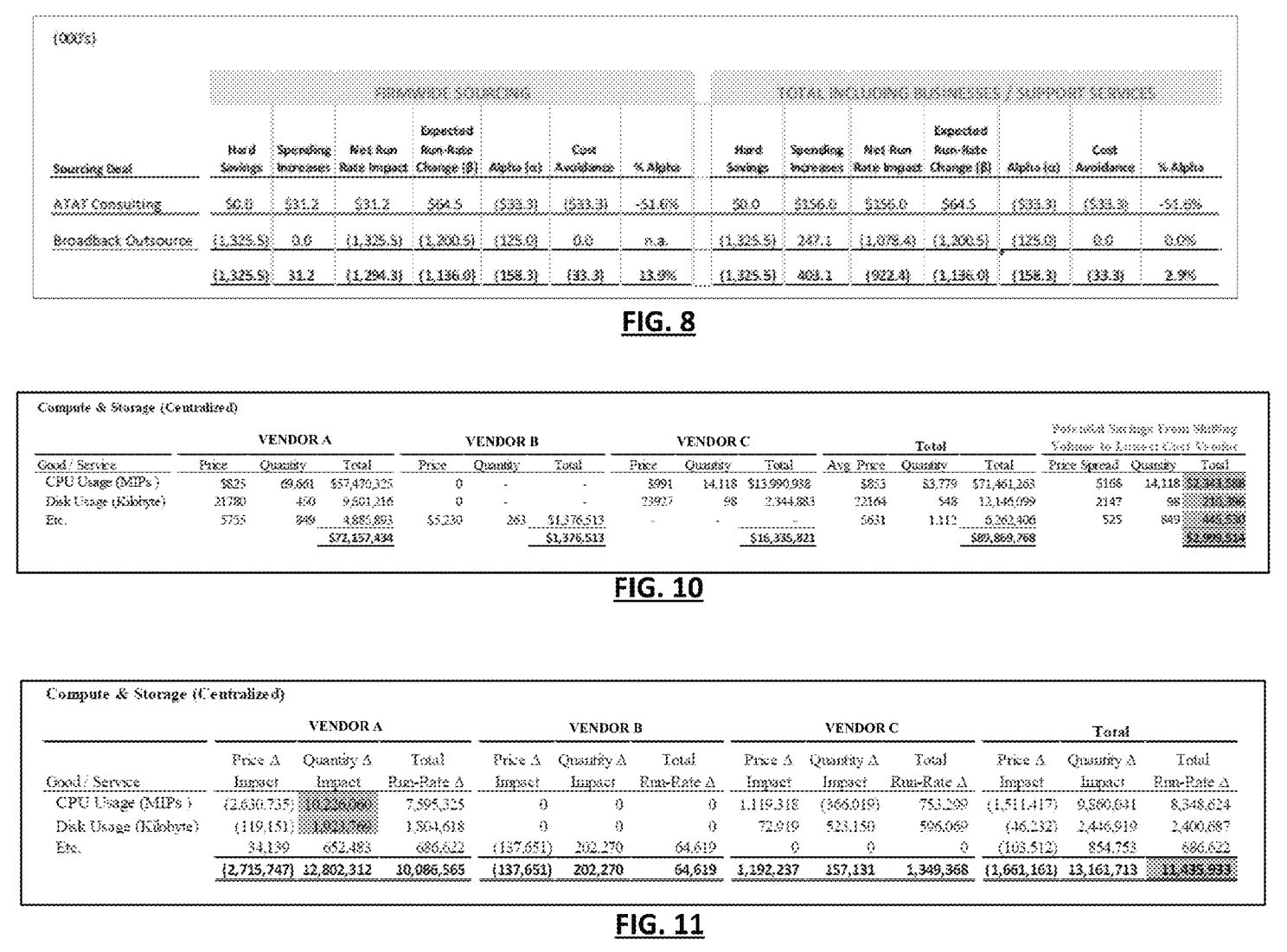

In various embodiments, the computer system 12, when executing the performance metric computation module 20 and/or the expense management analytics module 22, could generate summary reports or dashboards at deal or aggregate levels for reporting to the sourcing department or various members thereof (e.g., team leaders, etc.) when requested. With reference to FIG. 1, in various embodiments, the dashboard could be viewed graphically on a monitor of computer 38 that is connected to the computer system 12. For example, the computer system 12 may include a server that serves HTML pages to the computer 38 via the network 32, where the pages include the reports and can be viewed on the computer 38 with a browser. FIG. 8 shows a sample deal-level dashboard that could be generated and displayed. The example of FIG. 8 shows various metrics for two contracts, both at the firmwide sourcing level and the business unit/support service level, and also shows the aggregate for both the firmwide sourcing level and the business unit/support service level. Of course, the report could be transmitted to the recipient in other formats, such a spreadsheet, a pdf file, etc.

In the examples and embodiments described above, the metrics were computed for one-year time periods, although in other embodiments different time periods could be used if desired. Also, in some instances it may be desirable to compute the metrics for fiscal years, even though the contract time periods may not coincide with the fiscal year. For example, if two months of a one-year contract are in one fiscal year and 10 months are in the next fiscal year, than one-sixth of the contract's metrics could be allocated to the first fiscal year and five-sixth to the second fiscal year.

Figure 9A:
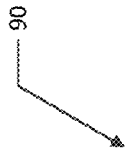
Figure 9B:
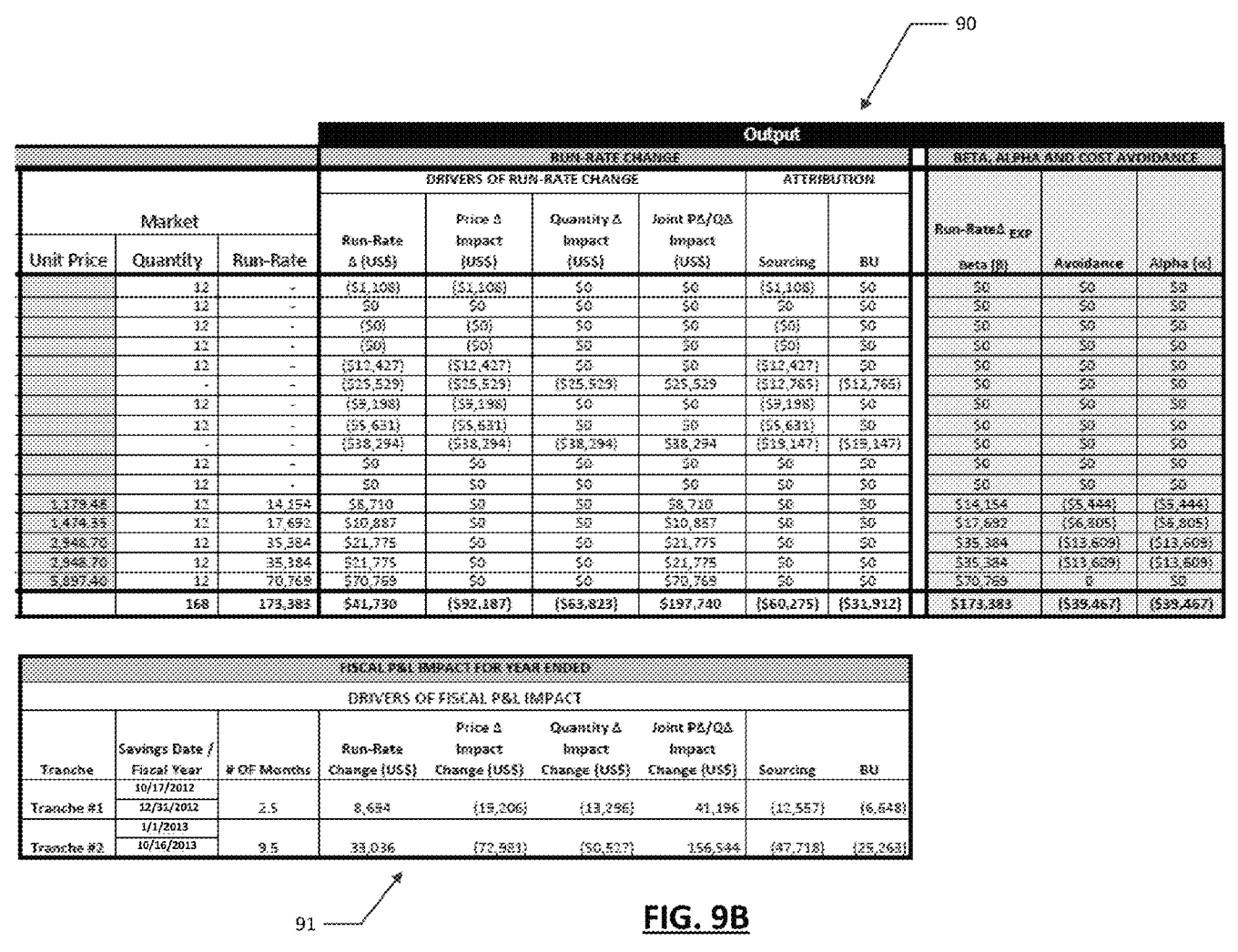

Also, where a single contract covers multiple goods and/or services, the metrics could be computed for each good/service covered by the contract, as shown in the example of FIGS. 9A-B. The upper table 90 of FIGS. 9A-B, which is one chart split between the two figures, shows the performance metrics for one contract that covers sixteen different services (in this example, IT-related services). The contract covering these sixteen services resulted in an overall run-rate impact of $41,730, a price change impact of negative $92,187, a quantity change impact of negative $63,823, and a joint price and quantity change impact of positive $197,740. In the example, for several of the services there was no baseline, so the price and quantity change impacts were $0, and the joint price/quantity change impact is equal to the overall run-rate impact. The attribution of the run-rate change across all of the services to the sourcing department was negative $60,275 and the attribution to the applicable business unit was negative $31,912. FIGS. 9A-B also show that the Alpha, Beta and Cost Avoidance can be computed for each individual service specified in the contract when there is market price data for the contracts, and aggregate beta, alpha, etc. can also be computed by summing the betas, alphas, etc. for the individual services of the contract.

In the example of FIGS. 9A-B, the contract is a twelve-month contract and became effective Oct. 17, 2012, so it was effective for 2.5 months in 2012 and for 9.5 months in 2013. In such a situation (e.g., where the contract term is not the same as the fiscal or calendar year), the drivers of fiscal P&L impact for the contract can be allocated to the two fiscal years, as shown in the lower table 91 of FIG. 9B. In the lower table 91, the drivers of fiscal P&L impact are broken out by tranches—Tranche #1 for year 2012 and Tranche #2 for year 2013. The lower chart 91 shows the aggregate overall run-rate impact, price change impact, quantity change impact, joint impact, and sourcing and BU attributions for the contract according to fiscal year (the two tranches) for P&L reporting purposes. Such a report could be generated by the computer system 12 and served to an end user 38.

As mentioned previously, the expense management analytics module 22 (see FIG. 1), when executed by the processor 14, causes the processor 14 to compute the same metrics (or a subset thereof) as the deal metric computation module 20, but across one or more expense categories (or sub-categories) and/or across one or more vendors, as opposed to at the contract/deal level or the good/service level (as in FIGS. 9A-B). Such analytics can facilitate a more in-depth analysis at the expense category thereby allowing the firm's management to get a better perspective on the vendors that are driving the expense changes in different expense categories. Computing the sourcing performance metrics across an expense category facilitates the ability to understand expense run-rate changes in terms of their price and consumption drivers. That understanding enables a more targeted expense management response to adverse trends that focuses on the root-causes and the responsible parties. Consider the following example. Assume that the expense for particular category, say Centralized Computing and Storage, has increased $11.4 million year-over-year. Preliminary analysis determined that almost 90% of the increase in this expense category was driven by one business unit of the firm, BU A, and that the entire increase relates to incremental spend with one vendor, Vendor A. Further analysis isolates the increased spends to Vendor A in this expense category to three general ledger sub-accounts—CPU Hardware Leasing, CPU Hardware Maintenance, and CPU Usage—which are up 3%, 5% and 18%, respectively. The amount paid to Vendor A in the current year in those subcategories totals $72.2 million, comprised of 168 invoices ranging in value from $508 to $3,755,152. The amount paid to Vendor A in the prior year in those subcategories totaled $62.1 million comprised of 159 invoices ranging in value from $495 to $3,618,973.

Traditionally, taking the analysis further to identify the particular goods and services that drove the year-over-year expense increase would involve the daunting effort of analyzing the 330 invoices. Even when that analysis is completed, understanding whether the increase is driven by higher prices or increased consumption will be challenging if not impossible because the price and quantity data underlying the invoices may not be captured in the firm's accounting records. Accordingly, determining appropriate remedial actions in response to the increased spend for Vendor A on CPU Hardware Leasing, CPU Hardware Maintenance, and CPU Usage is, at best, an inexact science under the traditional approach.

With the expense management analytics module 22, however, the performance metrics can be aggregated for all contracts in the Centralized Computing and Storage expense category. That way, all of the data used in the traditional analysis can be supplemented by the details of the individual goods/services and associated unit prices and quantities underlying the invoice amounts. Continuing with the example, assume that the metrics computed with the expense management analytics module 22 show that the 18% increase in expense sub-category of CPU Usage from Vendor A was driven incremental MIPs charges totaling $7,595,325 associated with a recently renewed mainframe outsourcing arrangement. The computed metrics further show that the incremental MIPs charges determined that the firm was benefiting from a 5.7% MIPs hourly rate decrease negotiated by the sourcing department, but that the savings was more than offset by an increase in MIPs consumption of 22.2%, as detailed in the computation of the metrics as show in Table 3 below.

pricing or consumption drivers). The table in FIG. 11 shows the price and quantity impact for the three expense sub-categories for the three different vendors. In this example, most of the $11.4 million of run-rate increase is driven by elevated consumption of Vendor A's CPU usage (a quantity change impact of $10.2 million) and disk usage (a quantity change impact of $1.9 million), which more than offsets the positive run-rate impact of the favorable pricing negotiated by the sourcing department, as evidenced by the negative price change impacts for Vendor A for CPU usage and disk storage.

Figure 12:
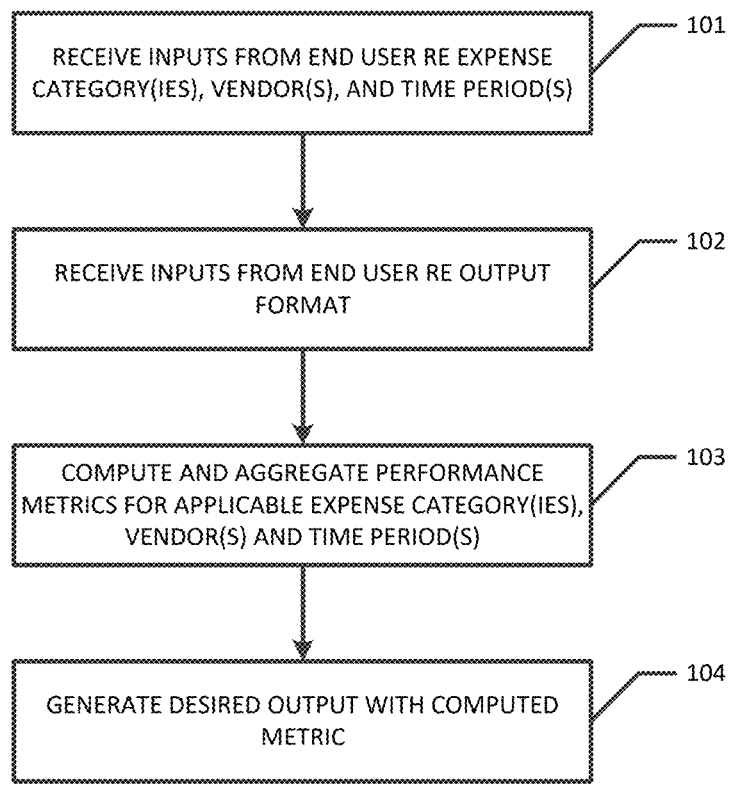
FIG. 12 is a flowchart showing a process flow for the computerized system for computing and aggregating the performance metrics across an expense category (or categories) according to various embodiments of the present invention.

FIG. 12 is a diagram of the process flow of the computer system 12 when executing the expense management analytics module 22 according to various embodiments of the present invention. The process may start at step 101, where the user (e.g., a user of the computer 38 in FIG. 1) inputs the details for the expense management analytics to be generated. For example, the user could specify the expense category or categories (and/or sub-categories) to be analyzed, the vendor(s), and the time periods. In various embodiments, the computer system 12 may serve the user an html web page where the user can input the specifications. For example, the user can input codes for the expense categories/sub-categories and vendor(s) in associated input fields in the web page. In other embodiments, the user can select the expense categories/sub-

TABLE 3

| | | | | DRIVERS OF RUN-RATE CHANGE | | | ATTRIBUTION | |
|---|---|---|---|---|---|---|---|---|
| Scenario | Baseline | Year 1 | Run-Rate Change | Price Δ Impact | Volume Δ Impact | Joint PΔ/QΔ Impact | Firmwide Sourcing | Business |
| Unit Price | $875 | $825 | | | | | | |
| Quantity | 57,000 | 69,661 | | | | | | |
| Run-Rate Expense | $49,875,000 | $57,470,325 | $7,595,325 | ($2,850,000) | $11,078,375 | ($633,050) | ($2,630,735) | $10,226,060 |

The computed metrics further show that the contract generated positive Alpha on the deal of $1.39 million, driven by an hourly MIPs market price of $845, as compared to the $825 negotiated by the sourcing team. Accordingly, the sourcing department can then shift its focus to the business to understand the drivers of the increased MIPs consumption and the possibilities of reducing consumption going forward.

The expense management analytics module 22 may generate various views of the performance metric data to support a sourcing team's efforts to identify and respond to trends in expenses and other anomalies that may lead to savings opportunities. The generated reports could be served or otherwise transmitted to an end user at computer 38 (see FIG. 1). For example, the expense management analytics module 22 may generate a table as shown in FIG. 10 in which potential savings opportunities from shifting consumption to the lowest-cost provider can be identified. The table in FIG. 10 shows the run-rate for three different services (CPU usage, Disk Usage, and miscellaneous ("Etc.")) for three different vendors (A, B and C). This example shows that there is a $166 per unit price spread between Vendors A and C for CPU usage, and that the firm could potentially save $2,343,588 by shifting the 14,118 MIPs from Vendor C to Vendor A. Similarly, for disk usage, the firm could save $210,396 by shifting from Vendor C to Vendor A. For the other services ("Etc."), the firm could say $445,530 by switching from Vendor A to Vendor B.

The expense management analytics module 22 may also generate reports that show the price change and quantity change impacts across the expense categories, as shown in the table in FIG. 11, which can be used to point the drivers of change in the expense run-rate (e.g., vendor, good/service, categories and vendor(s) from drop-down menus, check boxes, radio buttons, etc., or any other appropriate and suitable user input means. The user can also specify the applicable time periods over which the expense data are to be aggregated via an input means on the web site. At step 102, the user can also specify the desired output format. For example, the user could specify an output table that shows the sourcing performance metrics for the specified expense categories/vendors as shown in Table 3 above. Also (alternatively or additionally), the user could specify output tables as shown in FIG. 10 (potential savings) or 11 (price and quantity change impacts). At step 103, the computer system computes and aggregates the sourcing performance metrics based on the user's input specifications and based on the data stored in the database 24. At step 104 the computer system then generates the desired output table, with the computed/aggregated metrics, and serves it to the user 38, such as via a web page and/or a file that is transmitted to the end user 38.

The aggregate sourcing performance metrics generated with the expense management analytics module 22 can also be used for enhanced pre-RFP (Request for Proposal) analytics. Under the approach used historically for RFPs, sourcing teams typically begin the RFP process with minimal insight into baseline spend data, generally limited to the aggregate payments to the vendor over the prior year. This approach creates an information asymmetry, providing the incumbent vendor with a clear advantage in negotiating the commercial terms of the contract. However, providing sourcing teams with baseline spend data detailed by good/service, price and quantity (i.e., P*Q methodology) ahead of the RFP process, generated by the expense management analytics module 22 as explained above, can level the playing field by minimizing information asymmetry. This is particularly true for contracts involving large complex baskets of goods and services. For example, the rate card for an international firm's global airline deal may involve thousands of unique fares based on different combinations of city pairs, seat assignments, booking dates, etc. Knowing only the aggregate spend is of little value in vendor negotiations. However, knowing the price and quantity details for each unique fare in the rate card enables the sourcing team to focus their negotiations on city pairs that are most impactful to the firm's economics. It is also is helpful modeling the overall P&L impact of the proposals submitted by the airlines. Other common examples of contracts involving large baskets of goods and services and complex rate cards include those with professional services vendors, brokers and office supplies vendors.

The examples and embodiments described above did not account for depreciation of capital assets. Capital expenditures represent outlays for fixed assets that are typically recorded on a firm's balance sheet rather than expensed as purchased. These include the cost of IT consultants working on internally developed software subject to capitalization, computer hardware and other equipment, furniture and fixtures, land and buildings, and leasehold improvement, for example. Expenditures on capital assets impact the expense run-rate as the assets are depreciated over their useful lives. Accordingly, in various embodiments, the net run-rate impact of sourcing activities and cost avoidance KPIs for deals involving the purchase of capital assets should be based on the depreciation (e.g., annual depreciation) of the new assets compared with the depreciation recorded over the preceding twelve-month period for the assets they replaced. Also, some sourcing teams may use a practice whereby the run-rate savings are ignored on deals involving capital assets, and only cost avoidance is captured. In those cases, cost avoidance is measured on a cash basis rather than a GAAP (i.e., depreciated cost) basis. To avoid this, in various embodiments the impact of capital expenditures on depreciation expense could be captured in the net run-rate impact of sourcing activities or cost avoidance as the facts may dictate. Measurement could be based on annual depreciation amounts for the old and new assets, not on the cash outlay.

As an example, presume that on July 31, a firm retires 100 cubicles coincident with the end of their useful lives for accounting purposes (ten years). The 100 cubicles were purchased ten years ago for $250,000 and depreciated each year since at $25,000 per year. The firm replaces those cubicles with 100 new cubicles with comparable features from a different manufacturer at a cost of $200,000 compared with a market price benchmark price of $225,000. The net run-rate impact of sourcing activities KPI would capture a depreciation savings of $5,000 per year (prior annual depreciation of $25,000 vs. new annual depreciation of $20,000). There is no cost avoidance, as the depreciation effect of the negotiated below-market price ($225,000 vs. $200,000) is fully captured in the net run-rate impact of sourcing activities KPI.

Refunds and rebates can also be accounted for in various embodiments. Refunds represent the return of money by a supplier in satisfaction of an overpayment claim. These are one-time savings, with the run-rate benefit reversing in the following year. In various embodiments, refunds could be captured as a "savings" in the net run-rate impact of sourcing activities KPI in the year the refund is received. However, in the following year, the absence of the refund effectively increases the expense run-rate, and should be captured as increased spend in the net run-rate impact of sourcing activities KPI in that year. As an example, consider a situation where a vendor billing audit conducted in 2012 by a firm's sourcing department discovers a 2011 overpayment of $35,000 caused by a billing error in favor of the vendor. The vendor is notified and promptly issues a refund check for the full amount. The $35,000 credit reduces the 2012 expense and should be recorded as a "savings" in the net run-rate impact of sourcing activities KPI. However, in 2013 the absence of the $35,000 credit effectively increases the expense run-rate, and should be captured as increased spend in the net run-rate impact of sourcing activities KPI in that year.

Rebates represent a return of a portion of the invoice payments made to the supplier over the course of the year that are earned when volumes exceed agreed thresholds. Rebates effectively reduce the unit prices of the goods and services covered by the contract over its term. Payments typically are received annually on the anniversary date of the contract, and fully recognized in the P&L in the contract year to which they apply. In various embodiments, the year-over-year change in the rebate could be captured in the net run-rate impact of sourcing activities. As an example, assume that in 2012 (the first year of a new contract with supplier ABC), the firm earns a $125,000 volume rebate. In 2011 (the last year of the expired contract), a rebate of $100,000 was earned. The $25,000 increase should be captured as a "saving" in the net run-rate impact of sourcing activities KPI in 2012. If the volume declines in 2013, reducing the rebate to $90,000, the rebate decrease of $35,000 in the rebate from 2012 should be captured in the net run-rate impact of sourcing activities KPI as an increase in expense in that year. Vendor signing bonuses could also be captured in the net run-rate impact KPI as the bonus in amortized in a manner to the way rebates are treated.

In addition, any consumption taxes paid by a vendor and passed onto the firm could be included in the unit price provided such consumption taxes are not recorded in a separate account in the firm's general ledger. For example, assume that the sourcing department negotiated a one-year deal with a hotel chain covering a specific property with room-rate of $325 per night before taxes, a decrease of $25 from the prior contract. The room is subject to state and city sales taxes of 8.875% plus hotel tax of 5.585%, or total taxes of 14.46%. When taxes are included, the room rate declines from $400.61 ($350×1.1446) to $372.00 ($325×1.1446). Assume that in Year 1 the firm booked 2,000 room nights at the property and that consumption is expected to jump to 2,500 room nights in the first year (Year 2) under the new contract. The run-rate impact would be an increase of $128,780. If consumption taxes were not taken into account, $16,200 of run-rate impact would not have been accounted.

Also, in the examples and embodiments described above, the deals were all expressed in U.S. dollars. Of course, in other embodiments different currencies could be used. Further, for an international firm it might be desirable to compute all of the KPIs in a common currency, such as US dollars. In that case, the average annual exchange rate could be used. For example, supposed the sourcing team negotiates a deal with a foreign office supplies vendor to purchase copy paper for £4.00 per ream vs. a price of £4.25 under the prior contract. Consumption is expected to increase from 100,000 to 110,000 reams. The yearly average £/$ exchange rates for 2012 was 0.649, but is expected to increase to 0.656 in 2013. Table 4 below shows the run-rate change and drivers of the change expressed in US dollars.

TABLE 4

| | | | | DRIVERS OF RUN-RATE CHANGE | | |
|---|---|---|---|---|---|---|
| Scenario | Baseline | Year 1 | Run-Rate Change | Price Δ Impact | Volume Δ Impact | Joint PΔ/QΔ Impact |
| Unit Price | £4.25 | £4.00 | | | | |
| Quantity | 100,000 | 110,000 | | | | |
| Run-Rate Expense (LC) | £425,000 | £440,000 | | | | |
| £/$ Annual Avg. Rate | 0.649 | 0.656 | | | | |
| Run-Rate Expense (US$) | $654,854 | $670,732 | $15,878 | ($45,098) | $65,485 | ($4,510) |

The standard formulas are used in the calculations for Table 4 with the single modification that local currency unit prices are converted into US dollar equivalent unit prices using the relevant exchange rate corresponding to the price. For example, the Price Δ Impact of ($45,098) shown in the table below is calculated as follows:

$$\text{Price } \Delta \text{ Impact} = (P_1 - P_0) \times Q_0$$
$$= [(£4.00/0.656) - (£4.25/0.649)] \times 100{,}000$$
$$= (\$45{,}098)$$

Accordingly, the present invention is directed to systems and methods for automatically computing performance metrics for a sourcing department of a firm. In various embodiments, the system comprises a central computer system 12 comprising at least one processor 14 and at least one memory unit 16 that stores software for execution by the at least one processor. The system also comprises one or more client computers 30, 34, 36 in communication with the central computer system 12. The central computer system 12 receives from the one or more client computers 30, 34, 36 and stores in at least one database 24 data for multiple sourcing contracts negotiated by the sourcing department. The data for a sourcing contract that is received and stored by the central computer system 12 comprise at least a new unit price ($P_n$) for the goods/services of the sourcing contract and a new (estimated) quantity ($Q_n$) for the goods/services of the sourcing contract. Further, the central computer system 12 is programmed to: (i) compute an overall run-rate impact for each of the multiple sourcing contracts that represents a difference in a prior run-rate for the goods/services of the sourcing contract and a new run-rate for the goods/service of the sourcing contract based on the new unit price ($P_n$) and the new quantity ($P_n$); (ii) compute a unit price change impact on the overall run-rate for each of the multiple sourcing contracts based on a change in price for the goods/services of the sourcing contract and a quantity of the goods/service in a prior sourcing contract ($Q_{n-1}$) for the goods/services; (iii) compute a quantity change impact on the overall run-rate for each of the multiple sourcing contracts, based on a change in quantity for the goods/services of the sourcing contract and a price of the goods/service in the prior sourcing contract ($P_{n-1}$) for the goods/services; and (iv) compute a joint impact of price and quantity changes on the overall run-rate for each of the multiple sourcing contracts, which represents a residual of the overall run-rate impact that is not covered by the unit price impact change and the quantity price impact.

In various implementations, the central computer system 12 is further programmed to compute an attribution for the sourcing department of the overall run-rate impact for each of the multiple sourcing contracts. The central computer system 12 may also be further programmed to compute an aggregate attribution for the sourcing department of the overall run-rate impact for an aggregate of the multiple sourcing contracts. Additionally, the central computer system 12 may be further programmed to compute an expected run-change change (e.g., Beta) for each of the multiple sourcing contracts based on a market price for the goods/services for each of the multiple sourcing contracts. Furthermore, the central computer system 12 may be further programmed to compute, for each of the sourcing contracts, a numeric measure of a portion of the overall run-rate change that is uncorrelated with a change in the market price of the goods/services (e.g., Alpha).

In various implementations, the central computer system 12 is further programmed to compute an aggregated overall run-rate impact across a set of sourcing deals for one or more user-specified expense categories and/or one or more user-specified vendors based on the data for the set of sourcing deals that are associated with the one or more user-specified expense categories and/or the one or more user-specified vendors. The central computer system may also be programmed to compute an aggregate unit price change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors, In addition, the central computer system may be programmed to compute an aggregate quantity change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors. In addition, the central computer system may be programmed to compute an aggregate joint price and quantity change impact on the overall run-rate impact across the set of sourcing deals for one or more user-specified expense categories and/or one or more user-specified vendors based on the data for the set of sourcing deals that are associated with the one or more user-specified expense categories and/or the one or more user-specified vendors.

In various implementations, the method for automatically computing performance metrics for a sourcing department of a firm may comprise the step of receiving, by a central computer system 12 that comprises at least one processor 14 and at least one memory unit 16, from one or more client computers 30, 34, 36 in communication with the central computer system 12 data for multiple sourcing contracts negotiated by the sourcing department, where the data for a sourcing contract that is received by the central computer system comprise at least a new unit price for the goods/services of the sourcing contract and a new quantity for the goods/services of the sourcing contract. The method may also comprise the step of storing, by the central computer system 12, the data received by the one or more client computers in a database 24. The method may also comprise the step of computing, by the central computer system, an overall run-rate impact for each of the multiple sourcing contracts based on the data stored in the database, where the overall run-rate impact for a sourcing contract represents a difference in a prior run-rate for the goods/services of the sourcing contract and a new run-rate for the goods/service of the sourcing contract based on the new unit price and the new quantity. The method may further comprise the step of computing, by the central computer system, a unit price change impact on the overall run-rate for each of the multiple sourcing contracts based on the data stored in the database, where the unit price impact change on the overall run-rate for a sourcing contract is computed based on a change in price for the goods/services of the sourcing contract and a quantity of the goods/service in a prior sourcing contract for the goods/services. In addition, the method may comprise the step of computing, by the central computer system, a quantity change impact on the overall run-rate for each of the multiple sourcing contracts based on the data stored in the database, where the quantity price impact change on the overall run-rate for a sourcing contract is computed based on a change in quantity for the goods/services of the sourcing contract and a price of the goods/service in the prior sourcing contract for the goods/services. Also, the method may comprise the step of computing, by the central computer system, a joint impact of price and quantity changes on the overall run-rate for each of the multiple sourcing contracts based on the data stored in the database, where the joint impact of price and quantity changes on the overall run-rate represents a residual of the overall run-rate impact that is not covered by the unit price impact change and the quantity price impact. The Beta and Alpha for the sourcing contracts may also be computed in steps of the method.

All of the metrics computed by the central computer system 12 can be transmitted in one or more files to an end user 38 via the data network 32 (see FIG. 1). The files could be, for example, html files, web pages, spreadsheet files, etc.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, SSDs or hard disk drives. A computer-readable medium may also include memory storage that is physical, virtual, permanent, temporary, semipermanent, and/or semitemporary. A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Further, the various databases described herein may be implemented using, for example, disk storage systems and/or in-memory databases, such as the SAP HANA in-memory database system.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computerized system for automatically computing performance metrics for a sourcing department of a firm, the system comprising:
   a central computer system comprising at least one processor and at least one memory unit that stores software for execution by the at least one processor; and
   one or more client computers in communication with the central computer system, wherein the central computer system receives from the one or more client computers and stores in at least one database data for multiple sourcing contracts negotiated by the sourcing department, wherein the data for a sourcing contract that is received and stored by the central computer system comprise at least a new unit price for the goods/services of the sourcing contract and a new quantity for the goods/services of the sourcing contract; and
   wherein the at least one memory of the central computer system stores software that programs the at least one processor to:
      compute an overall run-rate impact for each of the multiple sourcing contracts, wherein computing the overall run-rate impact for a sourcing contract comprises subtracting (i) a prior run-rate for the goods/services of the sourcing contract from (ii) a new run-rate for the goods/service of the sourcing contract based on the new unit price and the new quantity;
      compute a unit price change impact on the overall run-rate for each of the multiple sourcing contracts, wherein computing the unit price impact change on the overall run-rate for a sourcing contract comprises computing a product of (i) a change in price for the goods/services of the sourcing contract and (ii) a quantity of the goods/service in a prior sourcing contract for the goods/services;
      compute a quantity change impact on the overall run-rate for each of the multiple sourcing contracts, wherein computing the quantity change impact on the overall run-rate for a sourcing contract comprises computing a product of (i) a change in quantity for the goods/services of the sourcing contract and (ii) a price of the goods/service in the prior sourcing contract for the goods/services;
      compute a joint impact of price and quantity changes on the overall run-rate for each of the multiple sourcing contracts, wherein the joint impact of price and quantity changes on overall run-rate represents a difference between the overall run-rate impact and the combination of the unit price impact change and the quantity change impact; and
      transmit the overall run-rate impact, the unit price change impact, the quantity change impact, and the joint impact of price and quantity changes in one or more electronic files to an end user computer system via an IP data network.

2. The computerized system of claim 1, wherein the at least one memory of the central computer system further stores software the programs the at least one processor to:
   compute an attribution for the sourcing department of the overall run-rate impact for each of the multiple sourcing contracts, wherein computing the attribution for the sourcing department of the overall run-rate comprises computing a sum of the unit price change impact and a sourcing department share of the joint impact of price and quantity changes; and
   transmit the computed attribution in the one or more electronic files to the end user computer system via the IP data network.

3. The computerized system of claim 2, wherein the at least one memory of the central computer system further stores software the programs the at least one processor to:
   compute an aggregate attribution for the sourcing department of the overall run-rate impact for an aggregate of the multiple sourcing contracts; and
   transmit the computed aggregate attribution in the one or more electronic files for the sourcing department to the end user computer system via the IP data network.

4. The computerized system of claim 1, wherein the at least one memory of the central computer system further stores software the programs the at least one processor to:
   compute an expected run-rate change for each of the multiple sourcing contracts based on a market price for the goods/services for each of the multiple sourcing contracts; and
   transmit the computed expected run-rate change in the one or more electronic files to the end user computer system via the IP data network.

5. The computerized system of claim 4, wherein the at least one memory of the central computer system further stores software the programs the at least one processor to:
   compute, for each of the sourcing contracts, a numeric measure of a portion of the overall run-rate change that is uncorrelated with a change in the market price of the goods/services; and
   transmit the numeric measures in the one or more electronic files to the end user computer system via the data network.

6. The computerized system of claim 1, wherein the one or more computers that is in communication with the central computer system and from which the central computer system receives the data for the multiple sourcing contracts comprises:
   at least one client computer of the sourcing department;
   at least one vendor computer system; and
   at least one computer system of the firm.

7. The computerized system of claim 1, wherein the at least one memory of the central computer system additionally stores software the programs the at least one processor to:
   compute an aggregated overall run-rate impact across a set of sourcing deals for one or more user-specified expense categories and/or one or more user-specified vendors based on the data for the set of sourcing deals that are associated with the one or more user-specified expense categories and/or the one or more user-specified vendors;
   compute an aggregate unit price change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors;

compute an aggregate quantity change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors; and transmit the aggregated overall run-rate impact, the aggregate unit price change impact and the aggregate quantity change impact in the one or more electronic files to the end-user computer system via the IP data network.

8. The computerized system of claim 7, wherein the at least one memory of the central computer system additionally stores software the programs the at least one processor to compute an aggregate joint price and quantity change impact on the overall run-rate impact across the set of sourcing deals for one or more user-specified expense categories and/or one or more user-specified vendors based on the data for the set of sourcing deals that are associated with the one or more user-specified expense categories and/or the one or more user-specified vendors.

9. The computerized system of claim 1, wherein the central computer system comprises at least one server that transmits the one or more electronic files to the end user via the IP data network.

10. The computerized system of claim 1, wherein the end user computer system graphically displays the overall run-rate impact, the unit price change impact, the quantity change impact, and the joint impact of price and quantity changes transmitted to the end user computer system by the central computer system.

11. A computerized method for automatically computing performance metrics for a sourcing department of a firm, the method comprising:

receiving, by a central computer system that comprises at least one processor and at least one memory unit, from one or more client computers in communication with the central computer system data for multiple sourcing contracts negotiated by the sourcing department, wherein the data for a sourcing contract that is received by the central computer system comprise at least a new unit price for the goods/services of the sourcing contract and a new quantity for the goods/services of the sourcing contract;

storing, by the central computer system, the data received by the one or more client computers in at least one database;

computing, by the at least one processor of the central computer system when executing software stored in the at least one memory, an overall run-rate impact for each of the multiple sourcing contracts based on the data stored in the database, wherein computing the overall run-rate impact for a sourcing contract comprises subtracting (i) a prior run-rate for the goods/services of the sourcing contract from (ii) a new run-rate for the goods/service of the sourcing contract based on the new unit price and the new quantity;

computing, by the at least one processor of the central computer system when executing software stored in the at least one memory, a unit price change impact on the overall run-rate for each of the multiple sourcing contracts based on the data stored in the database, wherein the unit price impact change on the overall run-rate for a sourcing contract comprises computing a product of (i) a change in price for the goods/services of the sourcing contract and (ii) a quantity of the goods/service in a prior sourcing contract for the goods/services;

computing, by the at least one processor of the central computer system when executing software stored in the at least one memory, a quantity change impact on the overall run-rate for each of the multiple sourcing contracts based on the data stored in the database, wherein computing the quantity change impact on the overall run-rate for a sourcing contract comprises computing a product of (i) a change in quantity for the goods/services of the sourcing contract and (ii) a price of the goods/service in the prior sourcing contract for the goods/services;

computing, by the at least one processor of the central computer system when executing software stored in the at least one memory, a joint impact of price and quantity changes on the overall run-rate for each of the multiple sourcing contracts based on the data stored in the database, wherein computing the joint impact of price and quantity changes on the overall run-rate represents a difference between the overall run-rate impact and the combination of the unit price impact change and the quantity change impact; and transmitting, by the central computer system, the overall run-rate impact, the unit price change impact, the quantity change impact, and the joint impact of price and quantity changes in one or more electronic files to an end user computer system via an IP data network.

12. The computerized method of claim 11, further comprising:

computing by the at least one processor of the central computer system when executing software stored in the at least one memory, an attribution for the sourcing department of the overall run-rate impact for each of the multiple sourcing contracts, wherein computing the attribution for the sourcing department of the overall run-rate comprises computing a sum of the unit price change impact and a sourcing department share of the joint impact of price and quantity changes; and transmitting, by the central computer system, the attribution for the sourcing department in the one or more electronic files to the end user computer system via the IP data network.

13. The computerized method of claim 12, further comprising:

computing by the at least one processor of the central computer system when executing software stored in the at least one memory, an aggregate attribution for the sourcing department of the overall run-rate impact for an aggregate of the multiple sourcing contracts; and transmitting, by the central computer system, the aggregate attribution for the sourcing department in the one or more electronic files to the end user computer system via the IP data network.

14. The computerized method of claim 11, further comprising:

computing by the at least one processor of the central computer system when executing software stored in the at least one memory, an expected run-rate change for each of the multiple sourcing contracts based on a market price for the goods/services for each of the multiple sourcing contracts; and transmitting, by the central computer system, the expected run-rate change in the one or more electronic files to the end user computer system via the IP data network.

15. The computerized method of claim 14, further comprising:
  computing by the at least one processor of the central computer system when executing software stored in the at least one memory, for each of the sourcing contracts, a numeric measure of a portion of the overall run-rate change that is uncorrelated with a change in the market price of the goods/services; and
  transmitting, by the central computer system, the numeric measures in the one or more electronic files to the end user computer system via the IP data network.

16. The computerized method of claim 11, further comprising:
  receiving, by the central computer system, user inputs that specify a set of sourcing deals, wherein the user inputs relate to one or more expense categories and/or one or more vendors of the good/services to the firm;
  computing, by the at least one processor of the central computer system when executing software stored in the at least one memory, an aggregated overall run-rate impact across the set of sourcing deals for the one or more user-specified expense categories and/or the one or more user-specified vendors based on the data for the set of sourcing deals that are associated with the one or more user-specified expense categories and/or the one or more user-specified vendors;
  computing, by the at least one processor of the central computer system when executing software stored in the at least one memory, an aggregate unit price change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors;
  computing, by the at least one processor of the central computer system when executing software stored in the at least one memory, an aggregate quantity change impact of the aggregated overall run-rate impact across the set of sourcing deals for one or more user-specified expense categories and/or one or more user-specified vendors based on the data for the set of sourcing deals that are associated with the one or more user-specified expense categories and/or the one or more user-specified vendors; and
  transmitting, by the central computer system, the aggregated overall run-rate impact, the aggregate unit price change impact, and the aggregate quantity change impact in the one or more electronic files to the end user computer system via the IP data network.

17. The computerized method of claim 16, further comprising:
  computing, by the at least one processor of the central computer system when executing software stored in the at least one memory, an aggregate joint price and quantity change impact on the overall run-rate impact across the set of sourcing deals for one or more user-specified expense categories and/or one or more user-specified vendors based on the data for the set of sourcing deals that are associated with the one or more user-specified expense categories and/or the one or more user-specified vendors; and
  transmitting, by the central computer system, the aggregate joint price and quantity change impact in the one or more electronic files to the end user computer system via the IP data network.

18. The computerized method of claim 11, wherein transmitting, by the central computer system, comprises transmitting by at least one server of the central computer system the overall run-rate impact, the unit price change impact, the quantity change impact, and the joint impact of price and quantity changes in the one or more electronic files to the end user computer system via the IP data network.

19. The computerized method of claim 11, further comprising graphically displaying, by the end user computer system, the overall run-rate impact, the unit price change impact, the quantity change impact, and the joint impact of price and quantity changes transmitted to the end user computer system by the central computer system.

* * * * *